(12) United States Patent
Krah et al.

(10) Patent No.: US 6,917,049 B2
(45) Date of Patent: Jul. 12, 2005

(54) AUTOTUNING METHOD AND SYSTEM BASED ON THE BILINEAR-QUADRATIC FILTER

(75) Inventors: Jens Onno Krah, Wuppertal (DE); George Ellis, Blacksburg, VA (US)

(73) Assignee: Kollmorgen Corporation, Simsbury, CT (US)

( * ) Notice: Subject to any disclaimer, the term of this patent is extended or adjusted under 35 U.S.C. 154(b) by 425 days.

(21) Appl. No.: 10/132,921

(22) Filed: Apr. 26, 2002

(65) Prior Publication Data

US 2003/0040817 A1 Feb. 27, 2003

Related U.S. Application Data

(60) Provisional application No. 60/286,904, filed on Apr. 27, 2001.

(51) Int. Cl.[7] .............................................. G01N 21/86
(52) U.S. Cl. .................................... 250/559.1; 250/221
(58) Field of Search .............................. 250/559.1, 221, 250/226, 231.1; 318/7, 8; 702/75, 72; 388/835, 832, 825

(56) References Cited

U.S. PATENT DOCUMENTS 6,622,099 B2 * 9/2003 Cohen et al. ................. 702/75

* cited by examiner

*Primary Examiner*—Que T. Le
(74) *Attorney, Agent, or Firm*—Morgan & Finnegan, L.L.P.

(57) ABSTRACT

A built-in autotuning system of a motor control system provides an autotuning of the motor control system based on BQF. The system measures the effective inertia and determines whether there exists a high-frequency resonance. If there is a high-frequency resonance, the system sets the BQF as a low pass filter, otherwise the system sets the BQF as a high pass filter. The system then adjusts the gains of the controller to set the phase and gain margins within a specified values.

33 Claims, 12 Drawing Sheets

AUTOTUNING METHOD AND SYSTEM BASED ON THE BILINEAR-QUADRATIC FILTER

This application claims the benefit of Provisional Application No. 60/286,904, filed Apr. 27, 2001.

FIELD OF THE INVENTION

This invention relates to a method and system for autotuning of a control system. More particularly, the present invention relates to an autotuning method and control system with an optional bilinear quadratic filter using frequency-domain based instrumentation configured to work in the presence of mechanical resonance.

BACKGROUND OF THE INVENTION

One of the most pervasive problems in motion control systems (e.g., a motor control system) is a mechanical resonance caused by a compliance in transmission between two inertias of controlled elements (e.g., motor and load). While the compliance between the motor and load is the most often cause, resonance can also come from the compliance between the motor and feedback, and sometimes come from the compliance within the load, where the load can be thought of as multiple inertias connected together by compliant couplings. Furthermore, resonance can be caused by a compliant motor mount so that the motor frame resonates within the machine frame. In other words, any of two inertias of the controlled elements coupled by compliant components may be the cause of the mechanical resonance of the motor control system.

Current autotuning methods to ameliorate the resonance problem in controlled elements provide a onetime excitation on the motor shaft and then correlate the applied torque against the measured acceleration. The relationship between the applied torque and measured acceleration yields the total inertia of the motor and load. By combining the knowledge of total inertia of the controlled elements with controller parameters of the control system, the controller gains can be set reducing the resonance effect.

While the various autotuning schemes designed according to the estimated inertias work well in the laboratory or as part of demonstration units where the mechanical coupling between motor and load is rigid, the same schemes do not work well on most practical motor control systems where the coupling between the motor and load inertia is compliant (i.e., flexible). In a motor control system with flexible coupling, the inertia estimated by the autotuning method is valid only at relatively low frequency ranges. At higher frequencies, the effective inertia of the load and motor combination varies greatly from the low-frequency (physical) inertia. The result is that the controller gains of the motor control system at higher frequency ranges, where stability problems are likely to occur, are often grossly misestimated by the resonance in the control system. As a result, when autotuning methods are applied to practical machines, the resulting controller gains for an autotuning process often produce instability.

SUMMARY OF THE INVENTION

The above-identified problems are solved and a technical advance is achieved in the art by providing an autotuning method and controller system to perform an autotuning of a motor control system based on a frequency response function using a bilinear quadratic filter (BQF).

In accordance with an aspect of the invention, a method of tuning a controller with a bilinear quadratic filter (BQF) of a motor control system having a motor controller, a motor and a load is disclosed. An exemplary method includes: measuring an effective inertia of the motor and load combination; determining whether there exists a type of resonance in the motor control system; setting the BQF as either one of a low pass filter or a high pass filter based on the type of resonance determined in the determining step.

In accordance with another aspect of the invention, a method of tuning a controller with a bilinear quadratic filter (BQF) of a motor control system having a motor controller, a motor and a load, is disclosed. An exemplary method includes: generating a first open-loop Bode plot of the motor control system over a predetermined frequency range; locating a first phase crossover in the first open-loop Bode plot; determining whether there exists a peak above the first phase crossover in the first open-loop Bode plot; if there exists a peak, setting the BQF as a low pass filter; if there does not exist a peak, setting the BQF as a high pass filter; generating a second open-loop Bode plot of the motor control system; calculating a GM and PM in the second open-loop Bode plot; determining whether each of the GM and PM is within a predetermined range; if the GM and PM are not within the predetermined range, setting a proportional loop gain of the motor control system; generating an initial closed-loop Bode plot of the motor control system; determining whether there exists a peak in the initial closed-loop Bode plot; if there exists a peak in the initial closed-loop Bode plot, setting the proportional loop gain of the motor control system; generating a non-integral closed-loop Bode plot of the motor control system; calculating an integral loop gain of the motor control system in the non-integral closed-loop Bode plot; determining whether the integral loop gain is within a predetermined range; and if the integral loop gain is not within the predetermined range, setting the integral loop gain.

In accordance with another aspect of the invention, a built-in autotuning system with a bilinear quadratic filter (BQF) within a driver controller of a motor control system having a motor controller, a motor and a load, is disclosed. An exemplary system includes: means for measuring an effective inertia of the motor and load combination; means for determining whether there exists a type of resonance in the motor control system; and means for setting the BQF as either one of a low pass filter or a high pass filter based on the information from the means for determining. In accordance with another aspect of the invention, a method of tuning a controller with a bilinear quadratic filter (BQF) of a motor control system having a motor controller, a motor and a load, is disclosed. An exemplary method includes: providing a plurality of filter parameters for the BQF; generating an open-loop Bode plot of the motor control system over a predetermined period of frequency; calculating a continuous stability margin by linearly combining phase and gain margins of the open-loop Bode plot; adjusting a proportional gain of the motor control system to a maximum level that provides the continuous stability margin; and selecting one of the combinations of the plurality of filter parameters for the BQF and the proportional gain that gives a highest responsiveness of the control system.

In accordance with another aspect of the invention, a built-in autotuning system with a bilinear quadratic filter (BQF) within a driver controller of a motor control system having a motor controller, a motor and a load, is disclosed. An exemplary system includes: means for providing a plurality of filter parameters for the BQF; means for generating an open-loop Bode plot of the motor control system over a predetermined period of frequency; means for calculating a continuous stability margin by linearly combining phase and gain margins of the open-loop Bode plot; means for adjusting a proportional gain of the motor control system to a maximum level that provides the continuous stability margin; and means for selecting one of the combinations of the plurality of filter parameters for the BQF and the proportional gain that gives a highest responsiveness of the control system.

In accordance with another aspect of the invention, a built-in autotuning system with a bilinear quadratic filter (BQF) within a driver controller of a motor control system having a motor controller, a motor and a load, is disclosed. An exemplary system includes: a memory unit; and a processing unit in communication with said memory unit, wherein said processing unit is configured to: measure an effective inertia of the motor and load combination; determine whether there exists a type of resonance in the motor control system; and set the BQF as either one of a low pass filter or a high pass filter based on the information whether there exists the type of resonance.

Other and further aspects of the present invention will become apparent during the course of the following detailed description and by reference to the attached drawings.

DETAILED DESCRIPTION

In a motor control system where a motor and load is controlled by a controller, there are two types of resonance problems (i.e., high frequency resonance and low frequency resonance) depending on the frequency ranges that the resonance occur. The terms "high" and "low" here do not imply that the frequencies are literally high or low. Rather, they simply imply whether the resonant frequencies are above or below the first phase crossover frequency in the open-loop Bode plot of the motor control system.

A high frequency resonance of a motor control system is an instability condition caused by an oscillation between the load and motor of the motor control system. The resonance condition results from a net reduction in the motor and load inertias oscillating at their natural frequency. The high frequency resonance takes place at a single, critical frequency.

A low frequency resonance of a motor control system is an instability condition caused by a decoupling of the load from the motor of the motor control system. The resonance condition results from a net reduction of the total inertias by the decoupling effect. Specifically, the decoupling problem in low-frequency resonance yields an undesirable condition that the effective inertia is high at low frequency ranges (i.e., coupled inertia) and low at high frequency range (i.e., decoupled inertia). So the effective controller gain, which is inversely proportional to the effective inertia, is low at low frequencies and high at high frequencies. This is an undesirable condition in a motor control system. A control system needs high gain at lower frequencies to provide good command and disturbance response and low gain at higher frequencies to avoid instability problems. The low frequency resonance takes place over a wide frequency range.

It is important to understand and distinguish the difference between these two problems in the motor control system since the symptoms of instability created by these problems varies considerably and the solutions to the problems are different, and in some cases are exactly the opposite.

Figure 1:
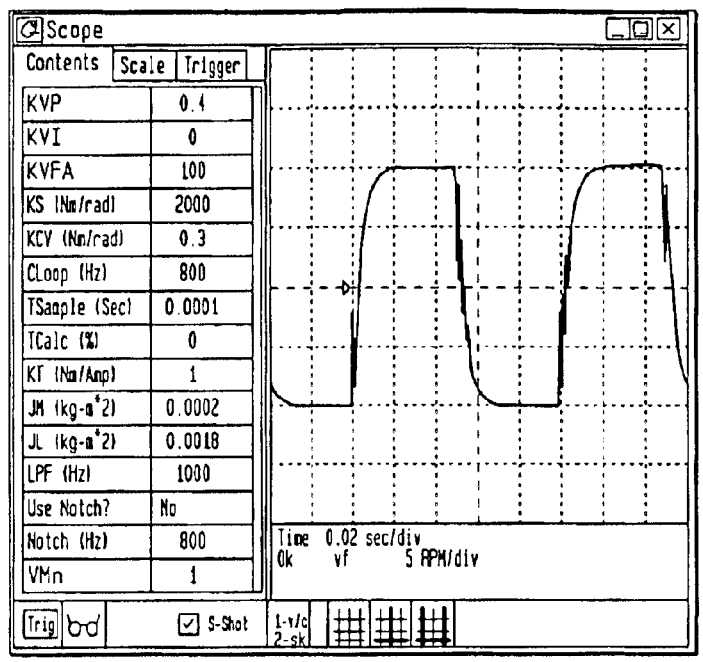
FIG. 1 shows the step responses of a system when the system is nearly unstable because of high-frequency resonance problems.
Figure 2:
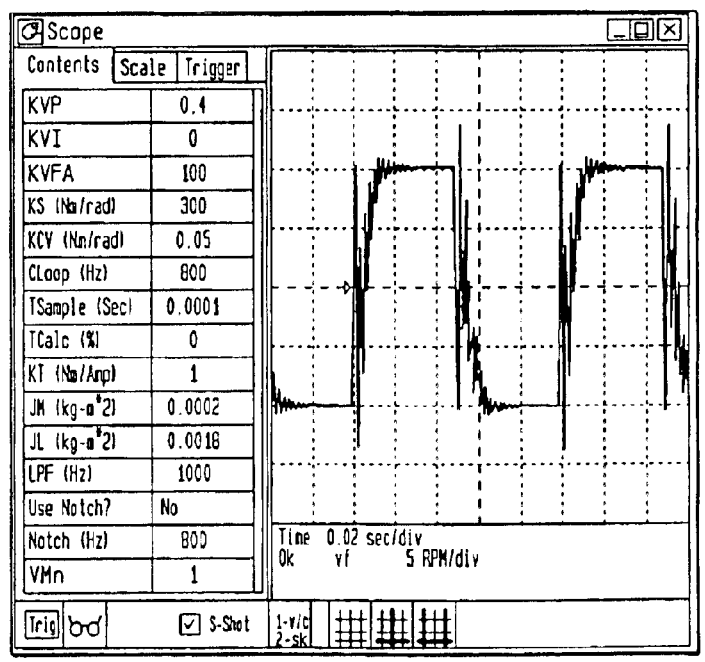
FIG. 2 shows the step responses of a system when the system is nearly unstable because of low-frequency resonance problems.

FIGS. 1, 2 show the step responses of a system when the system is nearly unstable because of high- and low-frequency resonance problems, respectively. A small magnitude oscillation is riding on the ideal step response where the oscillation in FIG. 1 is smaller (i.e., high-frequency resonance) than in FIG. 2 (i.e., low-frequency resonance). The difference of the oscillation, however, may not be big enough to be distinguished when each of the step responses is identified separately.

Figure 3:
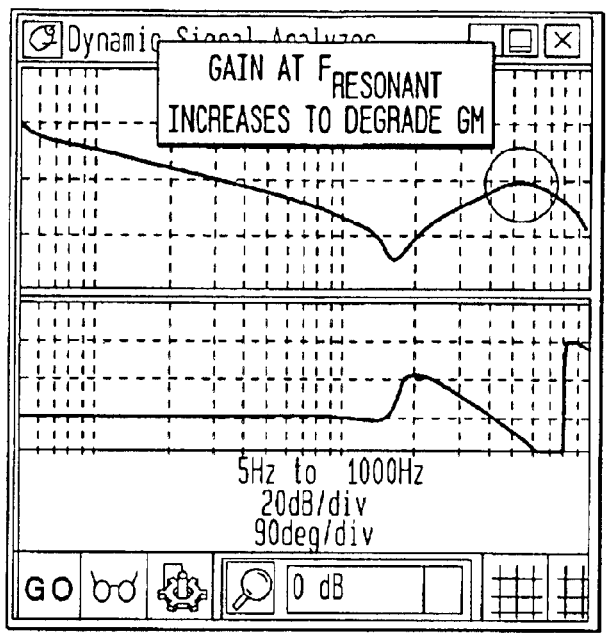
FIG. 3 shows the open-loop Bode plot of the step response of FIG. 1.
Figure 4:
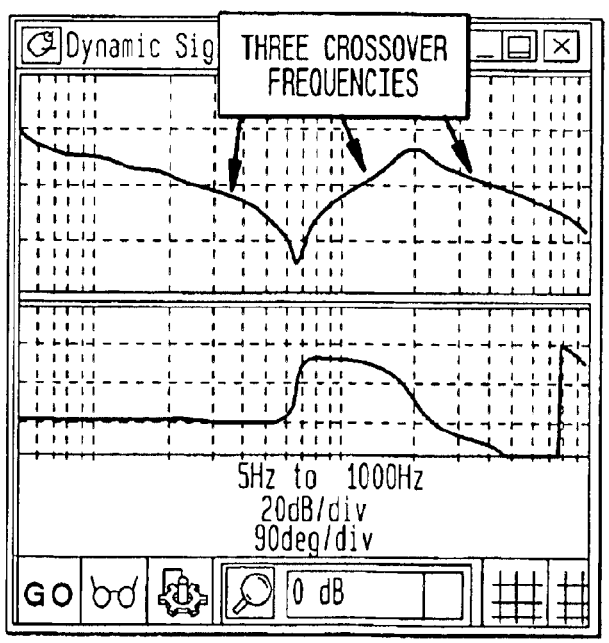
FIG. 4 shows the open-loop Bode plot of the step response of FIG. 2.

FIGS. 3, 4 show the open-loop Bode plot of the step responses in FIGS. 1, 2, respectively. In the high-frequency resonance (FIG. 3), the gain dips down below 0 dB below the first phase crossover frequency and then rises almost to 0 dB after the first phase crossover frequency. At this point, the phase is falling rapidly and the phase crossover frequency is nearby. It is indicated that there are three phase crossover frequencies in the high-frequency resonance. In the low-frequency resonance (FIG. 4), there are three gain crossover frequencies. The gain crosses through the 0 dB line three distinct times before the first phase crossover frequency.

The open-loop Bode plot of high-frequency resonance (FIG. 3) is markedly different from that of low-frequency resonance (FIG. 4). The main difference is at what frequency the instability occurs. The instability in FIG. 3 occurs at the peak of the gain corresponding to the second phase crossover frequency (i.e., at a minimum gain margin) while the instability in FIG. 4 occurs at the highest gain crossover frequency corresponding to the third gain crossover frequency where the phase is near −180° (i.e., at a minimum PM). In a sense, high-frequency resonance is a problem of GM where small changes in gain have a large impact and small changes in phase do not, while low-frequency resonance is a problem of PM where small changes in phase have a large impact whereas small changes in gain do not. The dramatic difference of open-loop Bode plot between high- and low-frequency resonance is one of several motivations in why it is important to have an on-board Bode plot in a motor control system according to the present invention (i.e., time domain scope plots often don not help tell the difference between the two problems).

The BQF is the most general second order filter (i.e., two-pole filter), so named because there are two quadratic terms, one in the numerator and another in the denominator. The unity-DC-gain form of the BQF is:

$$T(s)=\{(s^2+2\zeta_z\omega_z s+\omega_z^2)/(s^2+2\zeta_p\omega_p s+\omega_p^2)\}\{\omega_p^2/\omega_z^2\}$$

The filter constants, $\zeta$, and $\omega$, are subscripted with z or p according to their position; z terms are in the numerator because they affect the filter zeros and p-terms are in the denominator because they affect the filter poles. The constant term at the right of the equation adjusts the DC gain (s=0) for unity. The BQF has two degrees of freedom beyond the traditional notch filter. First, the zero and pole natural frequencies can be different. Second, the damping term in the numerator ($\zeta_z$) can be nonzero so that the natural frequency of the numerator ($\omega_z$) is not completely attenuated.

If the natural frequency of the numerator ($\omega_z$) is set below that of denominator ($\omega_p$), the filter acts like a high-pass filter. In control systems, high-pass filters are used to improve the phase of the open-loop Bode plot near the phase-crossover frequency, i.e., this configuration is ideal for dealing with low-frequency resonance. If the natural frequency of the numerator ($\omega_z$) is set above that of the denominator ($\omega_p$), the filter acts as a low-pass filter. In control systems, low-pass filters are used to reduce the gain of the open-loop Bode plot well above the phase-crossover frequency, this configuration is ideal for dealing with high-frequency resonance.

One of shortcomings of the high-pass filter form of the BQF is that it usually simultaneously raises the gain and the phase at high frequencies (e.g., above crossover frequencies). In fact, raising the phase is the desired effect and raising the gain is an unfortunate side effect because it amplifies noise. The higher gain also raises the crossover frequency pushing the frequency of instability higher. It is found that by setting the damping of the denominator ($\zeta_p$) to be much higher than that of the numerator ($\zeta_z$), the higher gain problem can be solved.

Figure 5:
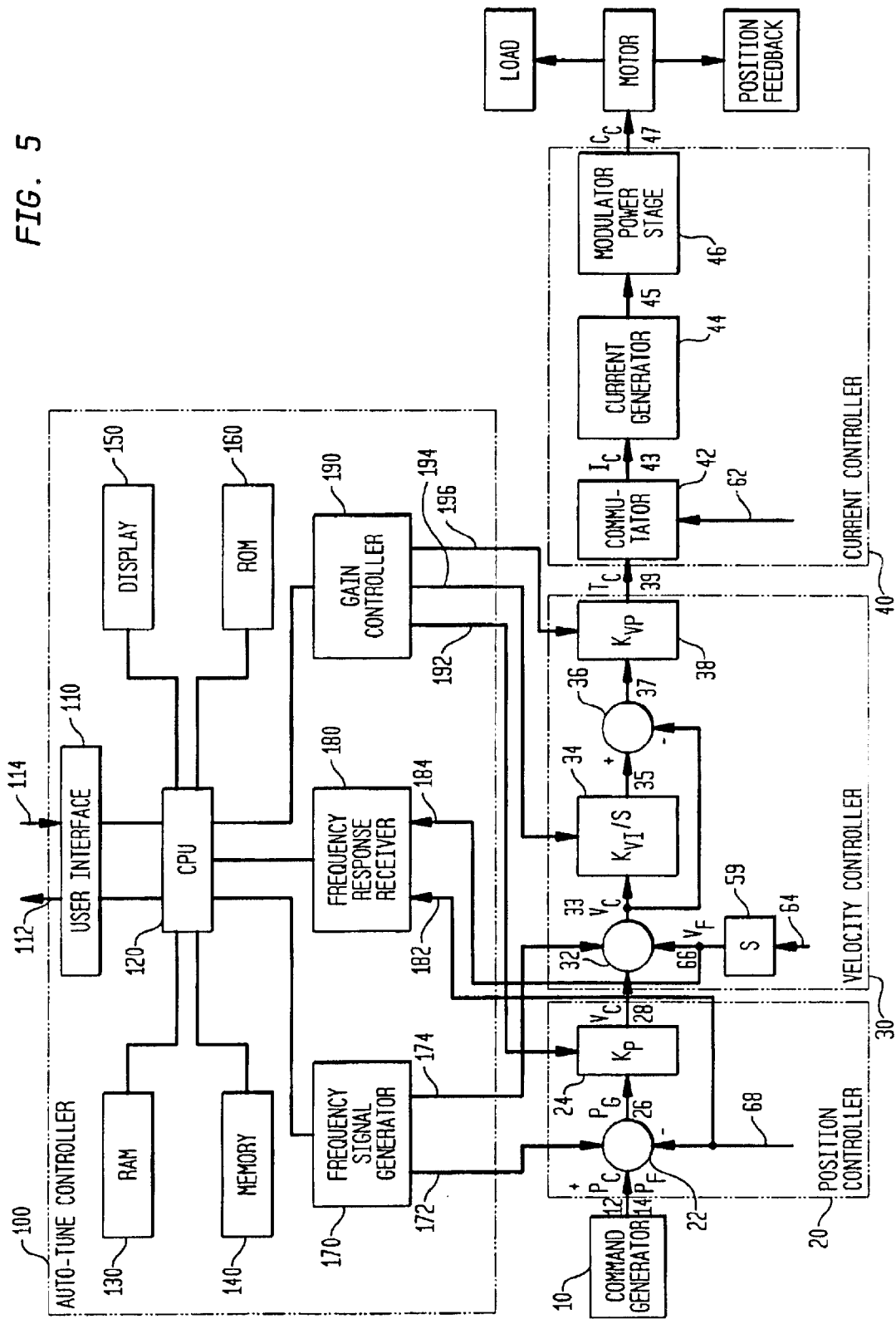
FIG. 5 illustrates a motor control system in which a built-in autotuning controller is implemented.

FIG. 5 illustrates a motor control system in which a built-in autotuning controller 100 of the present invention is implemented. The motor control system includes a position controller 20, velocity controller 30, current controller 40, motor 50, load 60 and position feedback 70. A command generator 10, issues commands for the control of the motor and load, is externally connected to the position controller of the motor control system through command and response paths. Upon receiving commands from the command generator, the position controller generates a positional output for the velocity controller and the velocity controller in turn generates a torque signal for the current controller. The torque signal is converted into a current signal in the current controller and the current signal is then input to the motor and load. The position feedback feeds back the position information from the motor to the current controller, velocity controller and position controller where the feedback output is subtracted from a reference input to form an error signal.

The autotuning controller 100 is configured to perform an autotuning of the control system based on the BQF. The autotuning controller is connected to both the position controller and velocity controller tuning either or both of the controllers. The autotuning controller is preferably implemented inside either of the two controllers in this embodiment. Alternatively, the autotuning controller may be implemented outside the two controllers as a separate unit. A personal computer may be utilized for this separate autotuning controller implementation.

The autotuning controller includes the basic elements such as a CPU 120, RAM 130, Memory 140 and ROM 160. The basic elements, in cooperation, are configured to operate as a BQF. Alternatively, the BQF may be implemented outside the autotuning controller as a separate unit. Further included is a user interface 110 for communication with a user and display 150 for displaying the test results (e.g., a frequency response function). The user interface may also be used to connect to a personal computer to download/upload data and software from the autotuning controller. The autotuning controller further includes a frequency signal generator 170, frequency response receiver 180 and gain controller 190. The frequency signal generator generates test signals (e.g., sinusoidal signal) and injects the test signals to the position controller and/or velocity controller depending on the situation for the autotuning process. The frequency response receiver receives the output signal (e.g., gain and phase), which is in response to the injected test signals via the position feedback. Upon receiving the output signal, the frequency response receiver sends the received signal to the CPU for a frequency domain analysis. The gain controller receives control information from the CPU and adjusts the gains of the position and/or velocity controllers. Other functional blocks may be added depending on specific tuning method.

The following summarizes the general features of the autotuning process of the present invention.

Upon receiving a request for an autotuning, the autotuning controller generates and measures the open-loop Bode plot to identify the motor/load combination together with fixed controller functions such as the current loop or R/D conversion. The generation of the Bode plot may start with low controller gains to ensure the stable operation of the system, so reliable measurements can be taken.

The autotuning controller then searches for peaking in the gain above the first phase crossover frequency. The significant peaking above the first phase crossover frequency indicates that a high frequency resonance will be the likely problem. In this case, the autotuning controller sets the BQF as a low pass filter. On the other hand, if there is no significant peaking above the first phase crossover frequency, the autotuning controller sets the BQF as high pass filter. The instability from low frequency resonance is treated the same as the instability in the absence of resonance i.e., the instability is caused by insufficient PM at the first phase crossover frequency. After the BQF is installed, the open-loop Bode plot must be calculated again to set the velocity loop proportional gain to meet a specified GM and PM.

While the GM and PM are effective in setting initial values of gains, the closed-loop measures of stability (e.g., a peaking) can vary considerably. Thus, it is necessary to evaluate a high frequency peaking in the closed-loop Bode plot and reduce the velocity loop gain if there is peaking. The final step involves setting the integral gain as a fraction of the bandwidth of the closed-loop Bode plot.

Figure 6:
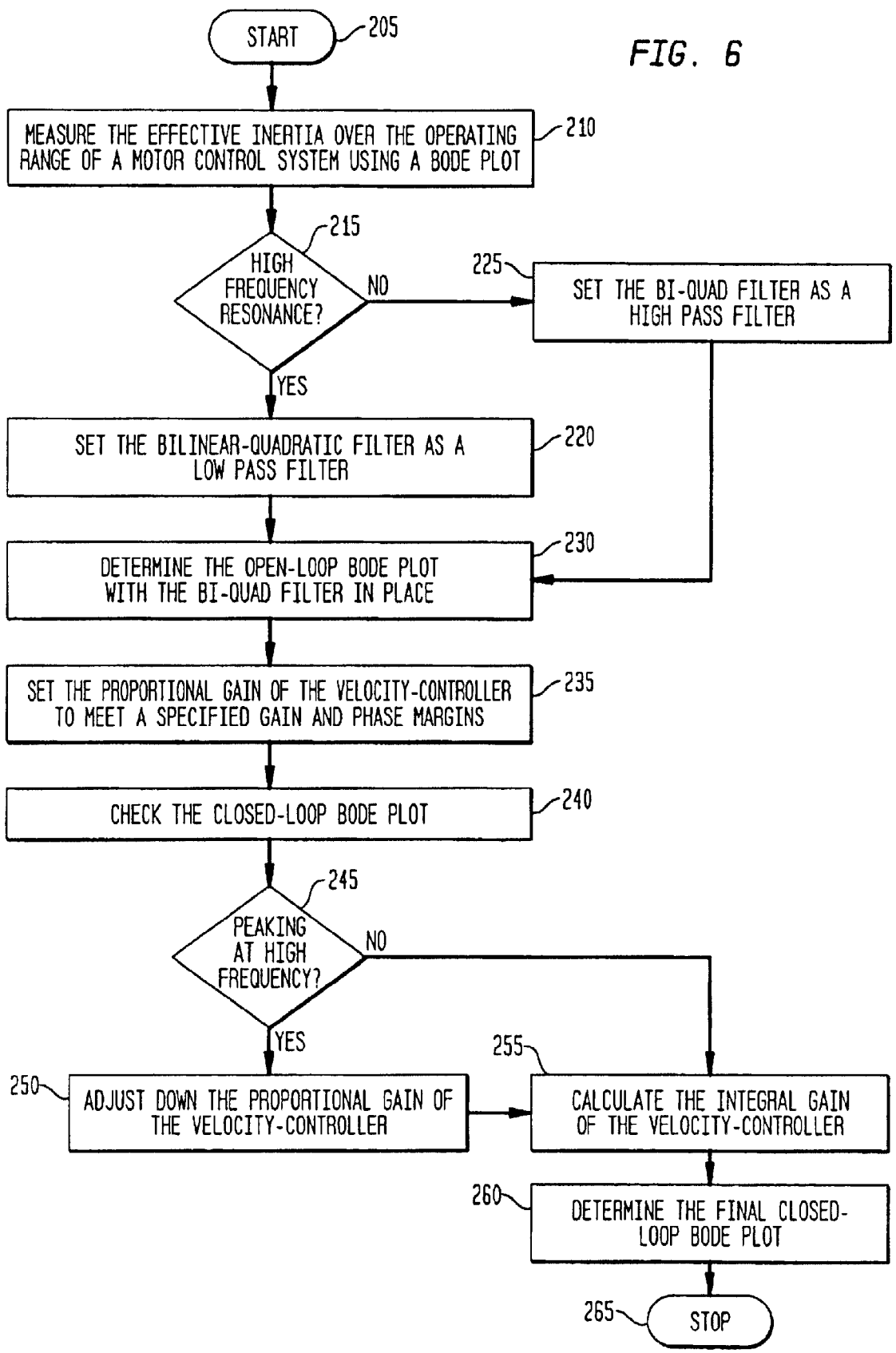
FIG. 6 is a flow chart illustrating an exemplary process by which the autotuning controller performs tuning for the motor control system of FIG. 5.

FIG. 6 is a flow chart illustrating an exemplary process by which the autotuning controller performs tuning for the motor control system of FIG. 5.

At step 210, the autotuning controller measures the effective inertia over the operating frequency range of the system by generating a Bode plot. The frequency signal generator injects a sinusoidal test signal to the loop of the velocity controller assuming that the tuning process is directed to the velocity controller. Alternatively, the frequency signal generator may inject the test signal to the loop of the position controller. The process starts at a very low frequency which is lower than the achievable velocity controller bandwidth to avoid any damage of the motor control system. For example, a starting frequency of 20 Hz is lower than the achievable cross-over frequency in nearly all servo applications.

In response to the test signal, the frequency response receiver receives response data. For example, the frequency response receiver may receive the gain and phase values at signal path 66 where feedback signal from the position feedback is differentiated by a differentiator 59. The received data may be stored in the memory of the autotuning controller. The injecting and receiving steps are repeated throughout the operating range of the motor control system (e.g., every 5 Hz between 20–1500 Hz) generating an open-loop Bode plot.

At step of 215 of FIG. 6, based on the open-loop Bode plot generated on step 20, the autotuning controller determines whether there exists a high frequency resonance. The autotuning controller may screen the open-loop Bode plot to detect whether there is a sharp increase in gain above the first phase crossover frequency. The sharp increase in gain indicates a sudden decrease in the effective inertia due to an oscillation between the motor and load (i.e., high-frequency resonance).

At steps 220, 225, if there exists a high-frequency resonance, the autotuning controller sets the BQF as a low pass filter (step 220). If not, the autotuning controller sets the BQF as a high pass filter (step 225).

At step 230, with the filter in effect, the autotuning controller calculates the GM and PM by generating another open-loop Bode plot. The autotuning controller may repeat the same procedure in step 210 to generate an open-loop Bode plot and calculates the GM and PM.

At step 235, the gain controller of the autotuning controller sets the velocity loop proportional gain (i.e., $K_{VP}$) to meet the GM and PM specified values (e.g., 8 dB and 70°).

At step 240, the autotuning controller checks the closed-loop Bode plot to see if there is any peaking at high frequency range. The closed-loop Bode plot may be generated with the open-loop Bode plot simultaneously.

At step 245, the autotuning controller determines whether there is any peaking in the closed-loop Bode plot meaning that there exists instability in the control system.

At step 250, if there is peaking in the closed-loop Bode plot, the autotuning controller adjusts down the velocity loop proportional gain reducing the instability of the control system. If there is no peaking, the process proceeds with step 255.

At step 255, the autotuning controller calculates the velocity loop integral gain. Since the integral gain can be expressed in units of frequency, the integral gain may be set as a fraction of the bandwidth of the system calculated in the closed-loop Bode plot. For example, the ratio between the integral gain and the bandwidth may be set as 0.5.

At step 260, after setting the integral gain, the autotuning controller determines the final closed-loop Bode plot.

The pseudo-code for the autotuning algorithm is described herein below.

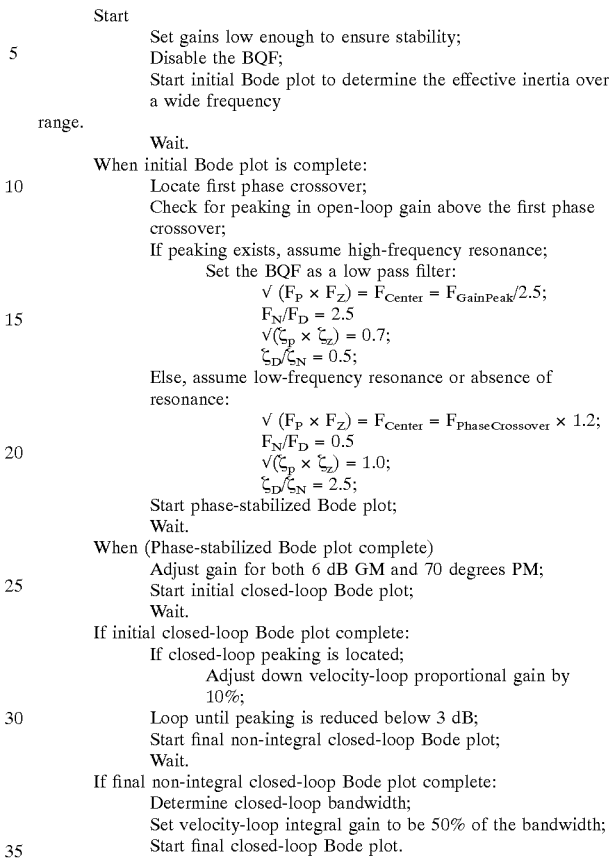

A second and different embodiment of the present invention is described herein below.

The main features of the second embodiment include: (1) A global search is performed based on single Bode plot trying out thousands of BQF combinations rather than attempting to calculate the optimal BQF based on automated analysis; (2) A continuous stability margin is used rather than using just phase and gain margins as in the first embodiment, which rely on data from only two frequencies; (3) Evaluates responsiveness of a system by integrating the area under the open-loop Bode plot; (4) The BQFs are pre-calculated and stored with logarithmic spacing of frequency. This eliminates almost all transcendental mathematics, divisions, and multiplications, making the method practical to be implemented directly on a controller.

The global search is performed based on a single Bode plot of a control system which includes the current loop, the motor, load and feedback. The Bode plot is combined mathematically with thousands of BQFs to find the best filter. The comparison between the Bode plot and each of the BQFs requires two main elements: The proportional gain, $K_{VP}$ in the simulations, is adjusted to the maximum level that provides the required margins of stability; A "responsiveness rating" is then calculated for each control system/BQF/$K_{VP}$ combination. The gain set with the highest responsiveness is selected.

User intervention may be required at the start of the search routine to assure that a valid Bode plot for the control system is available to the method. Also, user intervention may be required at the end to install the final gain values to minimize the likelihood that an unstable configuration is used.

However, these interventions are modest compared to the user interaction required for current autotuning methods.

The second embodiment is based on a continuous-frequency stability margins as opposed to a discrete-frequency stability margin of the first embodiment. In the first embodiment, the $K_{VP}$ is set based on the lesser of phase and gain margins, and then a Bode plot is generated to ensure the predetermined stability criteria are met. If the criteria were not met, the $K_{VP}$ is adjusted downward and another Bode plot is generated. This could result in numerous Bode plots. Also, in the first embodiment, instability is usually caused by a combination of low gain and low phase and is worse between the frequencies where the gain and phase margin are measured at either frequency.

The method of the second embodiment adopts a linear combination of gain and phase margins. For example, assuming that the GM is set to 14 dB and the phase margin to 60°, when the phase is −120°, the gain then should be 0 dB or less. If the phase is −180°, the gain must be less than −14 dB to maintain the required GM. Between −120° and −180° of phase, the method of the second embodiment uses a linear combination, i.e., $Gain_{MAX}=-|Phase+180|\times GM/PM$ dB. The same applies when the phase is between −180° and −240°. When the phase is outside −180°±PM, the gain is unrestricted.

The following summarizes the procedure for finding the optimal filter path.

As an exemplary method of performing the second embodiment, using the simulation program written in C and executing on a laptop computer with a 230 MHz clock, the time to run the calculation to create the plots of this disclosure required just over 1 minute. Since the computational resources available to this PC far exceed those available to a controller processor, these calculations in the controller would require many more times than the PC. However, the algorithm utilized in the second embodiment is designed to allow the pre-calculation of the BQF parameters reducing required computational resources (e.g., the total required computations may have been reduced by an order of magnitude). Currently, the number of calculations is predicted to be about 100 million integer operations (6400 filters×200 frequencies×100 operations per frequency). This is within the capability of the processors used on current controllers that can run the calculation in a few minutes. Accordingly, it is still reasonable that the required calculations may be performed on a controller, not on a remote PC.

The second issue relates to the quality of the Bode plot generated for the control system before autotuning begins. Even in the simulations, which are relatively insensitive to system noise, large changes in the mechanical parameters produced Bode plots with invalid data. The reason is that highly resonant loads brought on instability even with relatively low gains. Systems that are unstable or nearly unstable cannot be measured properly by practical methods.

```
Calculate bi-quad tables (typically 16, 8 tables of phase and 8 tables of gain for each of 8
    different damping ratios).
Do for all bi-quad combinations (typically 6,400)
    Do for each frequency where the control system Bode plot is measured
        Add the control system, the bi-quad numerator phase, and subtract the bi-
quad                   denominator phase.
        If the phase is between −180° ± PM, Gain_MAX = − |Phase + 180| × GM/PM.
            Otherwise, ignore stability concerns.
        Subtract control system gain, bi-quad numerator gain, and add the bi-quad
            denominator gain from Gain_MAX to calculate K_VPMAX.
    End Do
    For each bi-quad, set K_VP to the smallest value of K_VPMAX.
    Set Response = 0.
    Do for each frequency where the control system Bode plot is known
        Response = Response + bi-quad numerator gain in dB
        Response = Response + bi-quad denominator gain in dB
        Response = Response + control system gain in dB
    End Do
    Response = Response/Number of frequencies (this gives average gain)
    Response = Response + K_VP (Decibels are used so sub/add can be used)
    If Response is the largest so far, save this combination as the best set so far.
End Do.
```

Figure 7:
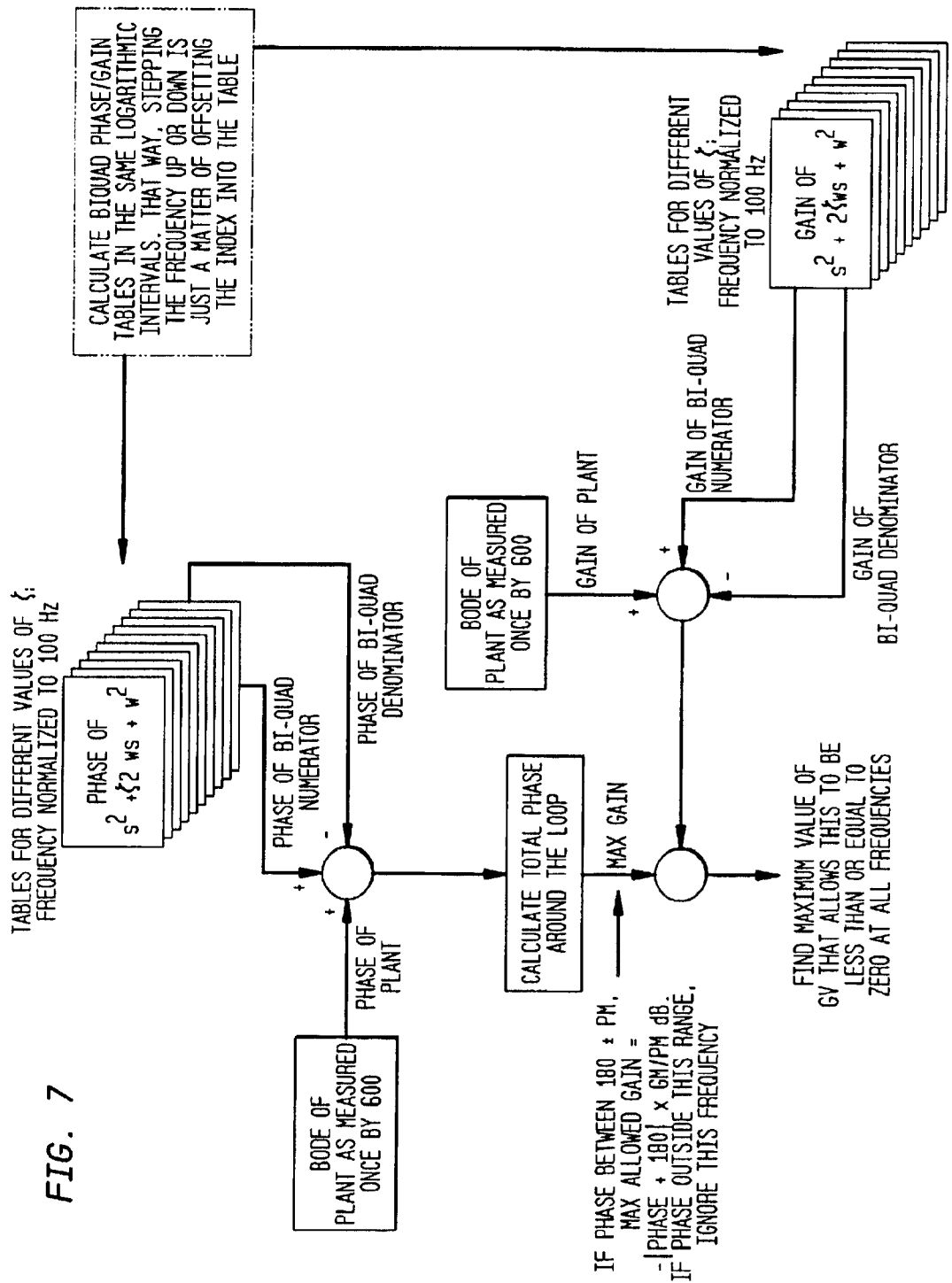
FIG. 7 shows a diagram for stability calculation for maximum gain, $K_{VP}$.

The control system does not need to be included in response calculations since it does not change as a function of gains and filter settings. Response calculations can be done while stability is calculated to reduce steps ($K_{VP}$ can only be added at the end). FIG. 7 shows a diagram for stability calculation for maximum controller gain.

There are several implementation issues that should be addressed. First, there is concern that the required computational resources may exceed the available resources if the controller is used to calculate the optimal gain and filter settings. While a remote personal computer (PC) may be utilized to run this calculation, there are advantages to performing calculations on the controller, especially that we avoid synchronization problems between the user interface software and the controller firmware.

Implementation issues specifically for the second embodiment are described herein below.

The result was that when mechanical parameters changed, the parameters of the Bode plot had to be change to allow valid measurement. This indicates that human intervention will be required in some cases so that automatic search routine is provided with a valid control system Bode plot.

The third issue also relates to the Bode plot. The Bode plot is evaluated at discrete frequencies (e.g., a swept-sine method). Each frequency is evaluated separately so that a balance must be made between the number of frequencies evaluated and the time allowed to perform the evaluation. Residences at high frequencies are often very lightly damped to perform the evaluation. Residences at high frequencies are often very lightly damped and often appear across a narrow band of frequency. If the spacing of the Bode plot frequencies is too coarse, the Bode plot may miss the resonance altogether. In this case, the autotuning method may not include the resonance and in many cases may configure a system that would be unstable. This can be avoided by spacing the Bode plot frequencies closely, but this increases the time to perform the Bode plot and the time to perform the optimal configuration search. Thus, the frequency spacing cannot be made arbitrarily small and one must allow for the case where the resonance is missed by the Bode plot. One tip here is that the automated search routine may configure the optimal BQF automatically, but with a very low proportional gain. Then the gain may be raised carefully to the apparently optimal value. In this way, if the method found an unstable configuration, the operator may see the problem before the gain is raised to its ultimate value.

In summary, the method and system of the present invention have ability to provide Bode plots of the control system , the key measurement required for the autotuning method. In addition, the method can produce BQF for an autotuning, either directly or indirectly through pole placement. The addition of the global search and continuous frequency margin measurements make the method being more easily adopted in the presence of complex mechanics. The required calculation for the method can be performed within a controller processor which is well within the ability of a personal computer. This will be helpful in building a customer-based autotuning system.

The second embodiment was tested in simulation using about 6,400 BQFs. The numerator and denominator zetas ranges from 0.3 to 5 in eight logarithmic steps (e.g., 0.3, 0.43, 0.61, 1.22, 1.74, 2.47, 3.52, 5.0). The center (natural) frequency of the numerator and denominator range from 5 to 500 in ten logarithmic steps (5, 7.92, 12.56, ... ). The control system Bode plot is evaluated at 200 frequencies between 5 to 1000 Hz, again in logarithmic steps. The GM is selected as 15 dB and the PM as 60°.

Figure 8:
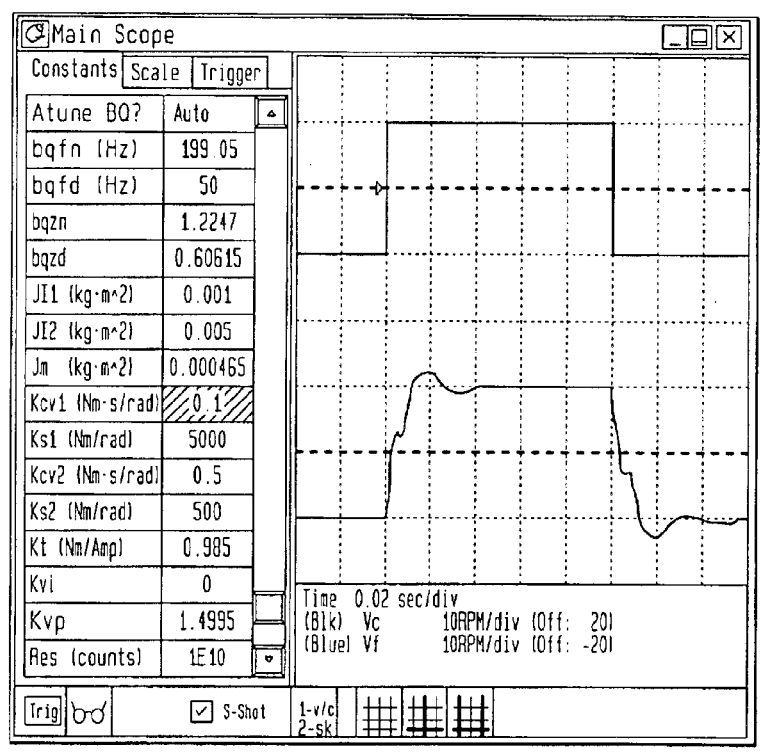
FIG. 8 is the step response of the system in which the autotuning method of the second embodiment is used.
Figure 9:
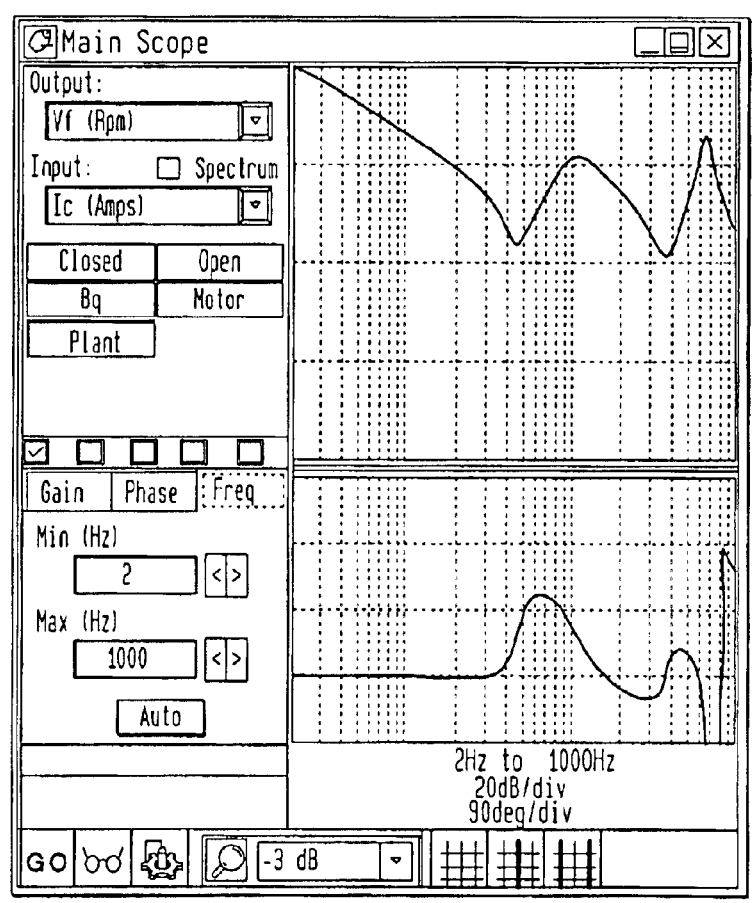
FIG. 9 is an open-loop Bode plot of the system in a three-inertia model showing two strong resonance frequencies.
Figure 10:
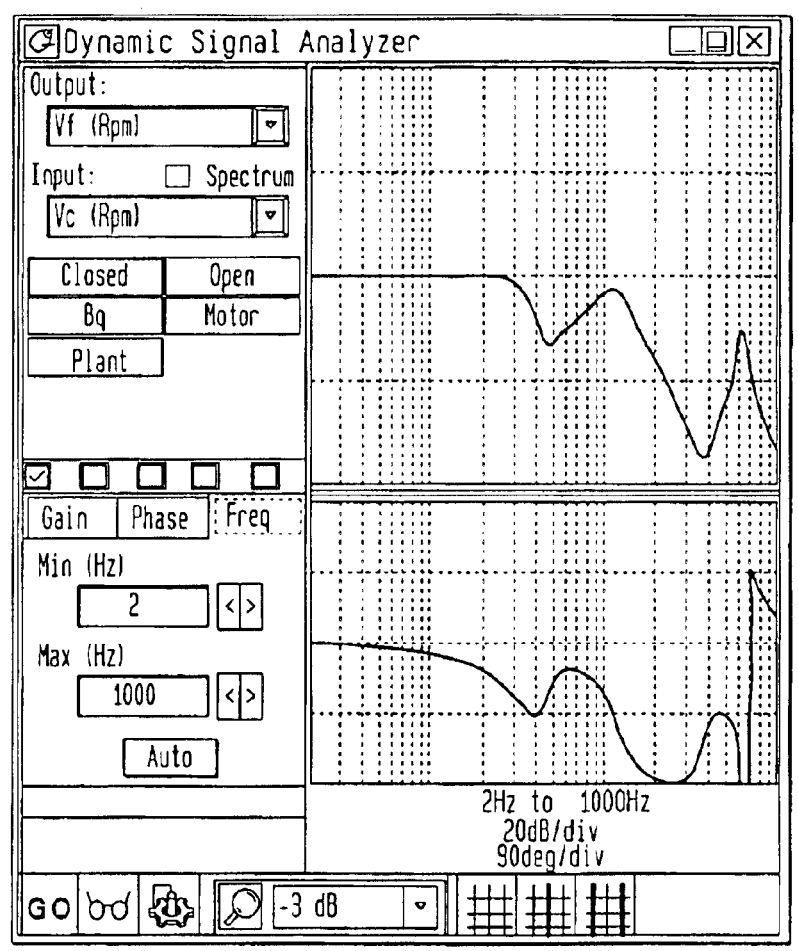
FIG. 10 is a closed-loop Bode plot after implementing the BQF as a low-pass configuration to eliminate the resonance.

FIG. 8 is the step response of the system in which the autotuning method of the second embodiment is used. FIG. 8 also shows the autotuning variables selected for the first mechanical configuration. FIG. 9 is an open-loop Bode plot of the system in a three-inertia model showing two strong resonance frequencies. FIG. 10 is a closed-loop Bode plot after implementing the BQF as a low-pass configuration to eliminate the resonance. The closed-loop Bode plot indicates a stable operation.

Figure 11:
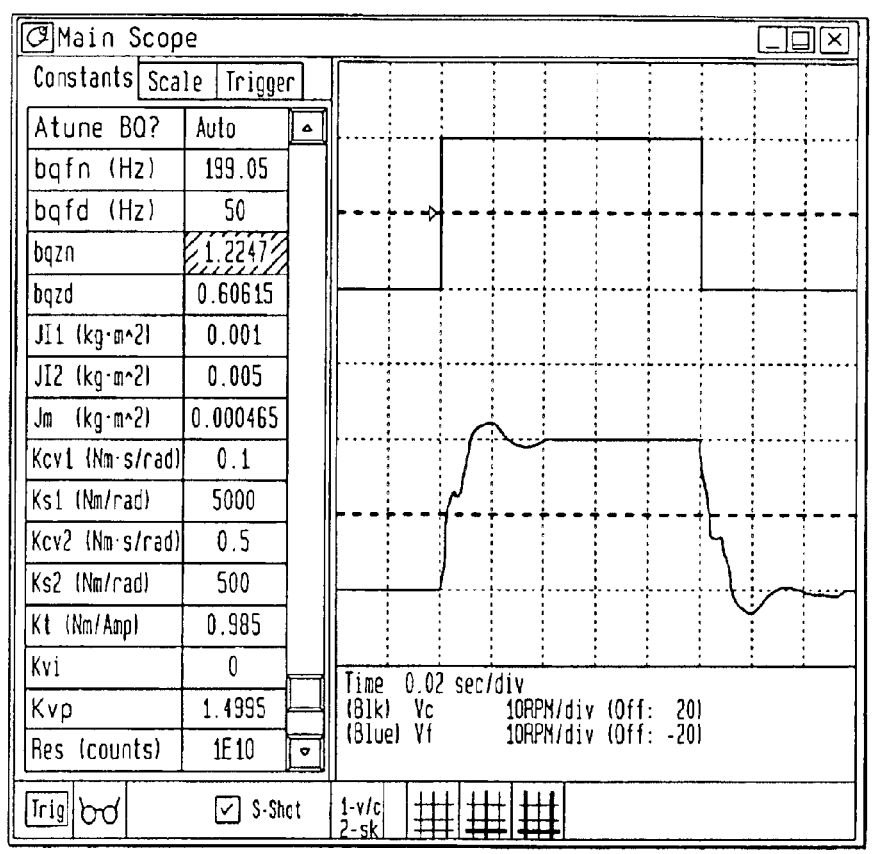
FIG. 11 is a step response of the system with enlarged motor inertia after autotuning.
Figure 12:
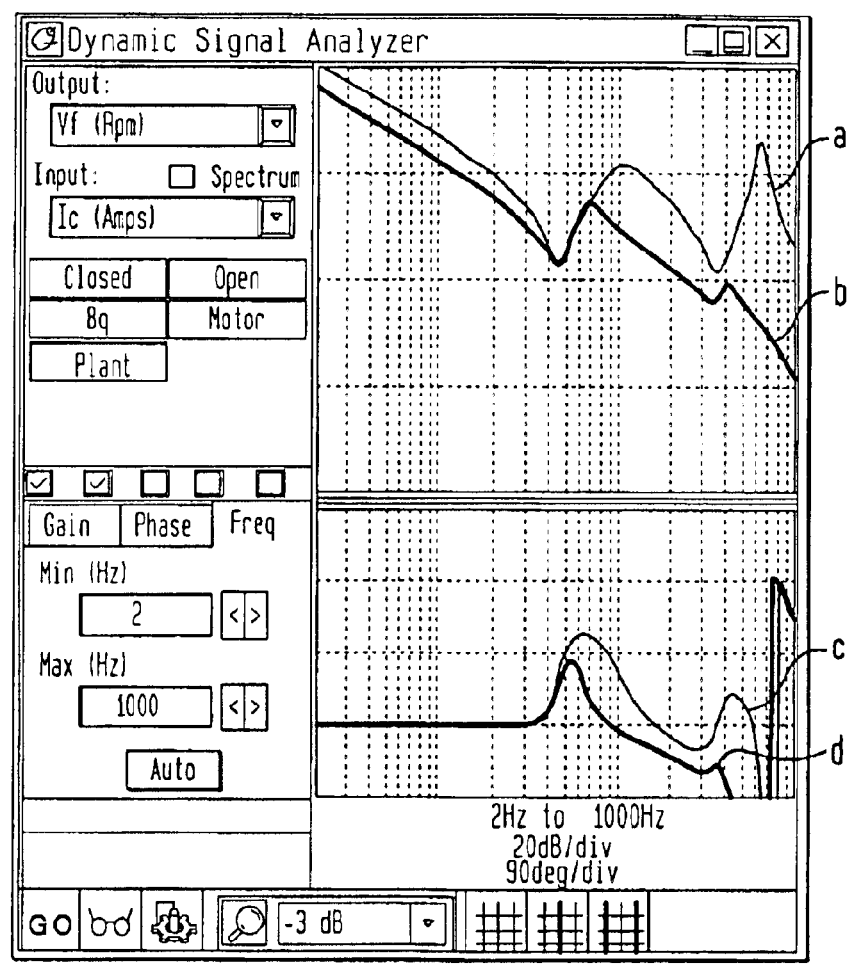
FIG. 12 shows open-loop Bode plots of the original system (a)(c) and the system with enlarged motor inertia (b)(d)
Figure 13:
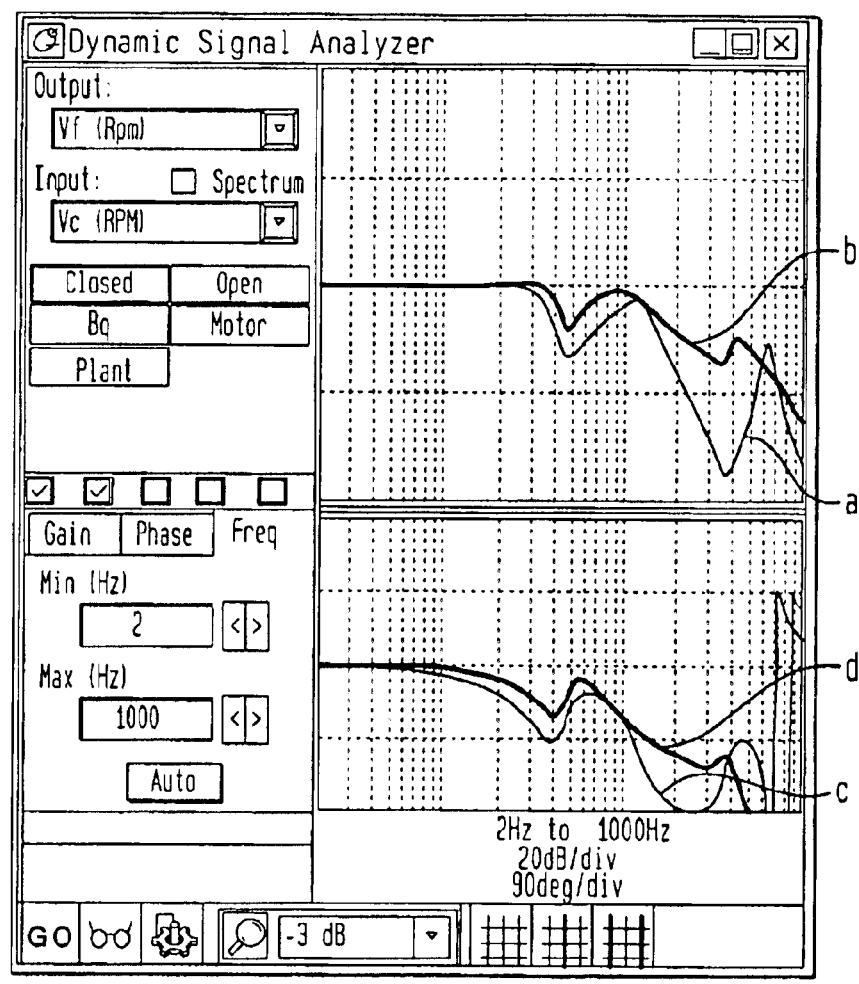
FIG. 13 shows closed-loop Bode plot of the original system (a)(c) and the system with enlarged motor inertia (b)(d)

Numerous variations in the control system may be made to see whether the autotuning method would generate an optimal BQF and gain. For example, raising the motor inertia from 0.000465 kg-m2 to 0.005 kg-m2 makes the control system much easier to stabilize because the load-to-motor inertia ratio is reduced. FIG. 11 is a step response of the system with enlarged motor inertia after autotuning. FIG. 12 shows open-loop Bode plots of the original system (a)(c) and the system with enlarged motor inertia (b)(d). FIG. 13 shows closed-loop Bode plot of the original system (a)(c) and the system with enlarged motor inertia (b)(d).

Figure 14:
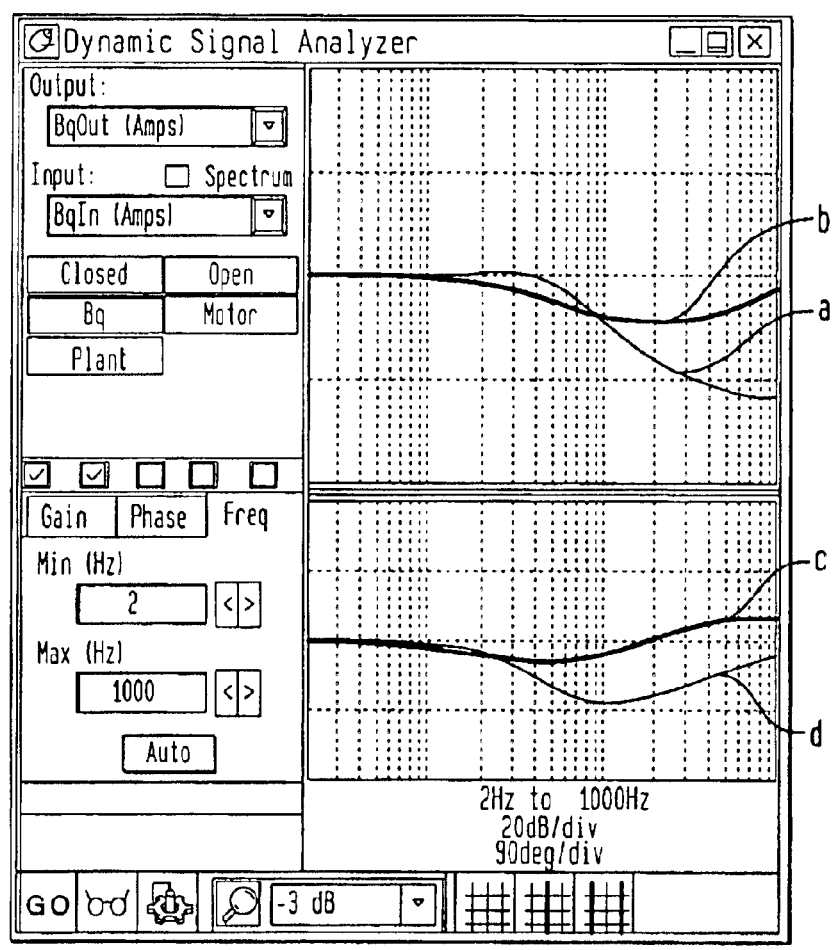
FIG. 14 shows an outcome of the automated search in the method of the second embodiment.

FIG. 14 shows an outcome of the automated search in the method of the second embodiment. The figure shows the two BQFs chosen for the two mechanical configurations. Note that the original, more resonant system (without increased motor inertia) required the BQF to be configured as a low-pass filter. This can be seen by observing the low gain of the original system filter (a) at high frequency. However, the BQF for the system with larger motor inertia is configured as a high-pass filter indicating that the mechanics are more stable and the best use of the BQF is to increase the phase margin.

The many features and advantages of the present invention are apparent from the detailed description, and thus, it is intended by the appended claims to cover all such features and advantages of the invention which fall within the true spirit and scope of the invention.

Furthermore, since numerous modifications and variations will readily occur to those skilled in the art, it is not desired that the present invention be limited to the exact construction and operation illustrated and described herein, and accordingly, all suitable modifications and equivalents which may be resorted to are intended to fall within the scope of the claims.

What is claimed is:

1. A method of tuning a controller with a bilinear quadratic filter (BQF) of a motor control system having a motor controller, a motor and a load, comprising:
   (1) measuring an effective inertia of the motor and load combination;
   (2) determining whether there exists a type of resonance in the motor control system; and
   (3) setting the BQF as either one of a low pass filter or a high pass filter based on the type of resonance determined in the determining step.

2. The method of tuning according to claim 1, wherein the measuring step utilizes an open-loop Bode plot of the motor control system.

3. The method of tuning according to claim 1, further comprising setting a gain margin and a phase margin of the motor control system within predetermined ranges.

4. The method of tuning according to claim 3, wherein the setting step further comprising setting a loop proportional gain.

5. The method of tuning according to claim 1, further comprising determining whether there exists an instability in the motor control system.

6. The method of tuning according to claim 5, wherein the determining step further comprising generating a closed-loop Bode plot of the motor control system.

7. The method of tuning according to claim 5, further comprising setting a loop proportional gain of the motor control system based on the information of the determining step.

8. The method of tuning according to claim 1, further comprising determining whether an integral gain of the motor control system is within a predetermined range.

9. The method of tuning according to claim 8, wherein the determining step further comprising setting the integral gain based on the information of the determining step.

10. A method of tuning a controller with a bilinear quadratic filter (BQF) of a motor control system having a motor controller, a motor and a load, comprising:
   (1) generating a first open-loop Bode plot of the motor control system over a predetermined frequency range;
   (2) locating a first phase crossover in the first open-loop Bode plot;
   (3) determining whether there exists a peak above the first phase crossover in the first open-loop Bode plot;
   (4) if there exists a peak, setting the BQF as a low pass filter;
   (5) if there does not exist a peak, setting the BQF as a high pass filter;
   (6) generating a second open-loop Bode plot of the motor control system;
   (7) calculating a GM and PM in the second open-loop Bode plot;
   (8) determining whether each of the GM and PM is within a predetermined range;
   (9) if the GM and PM are not within the predetermined range, setting a proportional loop gain of the motor control system;

(10) generating an initial closed-loop Bode plot of the motor control system;

(11) determining whether there exists a peak in the initial closed-loop Bode plot;

(12) if there exists a peak in the initial closed-loop Bode plot, setting the proportional loop gain of the motor control system;

(13) generating a non-integral closed-loop Bode plot of the motor control system;

(14) calculating an integral loop gain of the motor control system in the non-integral closed-loop Bode plot;

(15) determining whether the integral loop gain is within a predetermined range; and

(16) if the integral loop gain is not within the predetermined range, setting the integral loop gain.

11. A built-in autotuning system with a bilinear quadratic filter (BQF) within a driver controller of a motor control system having a motor controller, a motor and a load, comprising:

(1) means for measuring an effective inertia of the motor and load combination;

(2) means for determining whether there exists a type of resonance in the motor control system; and (3) means for setting the BQF as either one of a low pass filter or a high pass filter based on the information from the means for determining.

12. The built-in autotuning system according to claim 11, wherein the means for measuring generates an open-loop Bode plot of the motor control system.

13. The built-in autotuning system according to claim 11, further comprising means for setting a gain margin and a phase margin of the motor control system within predetermined ranges.

14. The built-in autotuning system according to claim 13, wherein the means for setting further comprising means for setting a loop proportional gain.

15. The built-in autotuning system according to claim 11, further comprising means for determining whether there exists an instability in the motor control system.

16. The built-in autotuning system according to claim 15, wherein the means for determining further comprising means for generating a closed-loop Bode plot of the motor control system.

17. The built-in autotuning system according to claim 15, further comprising means for setting a loop proportional gain of the motor control system based on the information whether there exists an instability.

18. The built-in autotuning system according to claim 11, further comprising means for determining whether an integral gain of the motor control system is within a predetermined range.

19. The built-in autotuning system according to claim 18, wherein the means for determining further comprising means for setting the integral gain based on the information whether there exists an instability.

20. A method of tuning a controller with a bilinear quadratic filter (BQF) of a motor control system having a motor controller, a motor and a load, comprising:

(1) providing a plurality of filter parameters for the BQF;

(2) generating an open-loop Bode plot of the motor control system over a predetermined period of frequency;

(3) calculating a continuous stability margin by linearly combining phase and gain margins of the open-loop Bode plot;

(4) adjusting a proportional gain of the motor control system to a maximum level that provides the continuous stability margin; and (5) selecting one of the combinations of the plurality of filter parameters for the BQF and the proportional gain that gives a highest responsiveness of the control system.

21. The method of tuning of claim 20, wherein the selecting further comprising calculating responses for a plurality of filter combinations.

22. The method of tuning of claim 21, wherein the calculating is performed while the continuous stability is calculated.

23. A built-in autotuning system with a bilinear quadratic filter (BQF) within a driver controller of a motor control system having a motor controller, a motor and a load, comprising:

(1) means for providing a plurality of filter parameters for the BQF;

(2) means for generating an open-loop Bode plot of the motor control system over a predetermined period of frequency;

(3) means for calculating a continuous stability margin by linearly combining phase and gain margins of the open-loop Bode plot;

(4) means for adjusting a proportional gain of the motor control system to a maximum level that provides the continuous stability margin; and (5) means for selecting one of the combinations of the plurality of filter parameters for the BQF and the proportional gain that gives a highest responsiveness of the control system.

24. The built-in autuning system according to claim 23, wherein the means for selecting further comprising means for calculating responses for a plurality of filter combinations.

25. A built-in autotuning system with a bilinear quadratic filter (BQF) within a driver controller of a motor control system having a motor controller, a motor and a load, comprising;

a memory unit; and a processing unit in communication with said memory unit, wherein said processing unit is configured to:

(1) measure an effective inertia of the motor and load combination;

(2) determine whether there exists a type of resonance in the motor control system; and (3) set the BQF as either one of a low pass filter or a high pass filter based on the information whether there exists the type of resonance.

26. The built-in autotuning system according to claim 25, wherein said processing unit is further configured to utilize an open-loop Bode plot of the motor control system to measure the effective inertia.

27. The built-in autotuning system according to claim 25, wherein said processing unit is further configured to set a gain margin and a phase margin of the motor control system within predetermined ranges.

28. The built-in autotuning system according to claim 27, wherein said processing unit is further configured to set a loop proportional gain to set the gain and phase margin.

29. The built-in autotuning system according to claim 25, wherein said processing unit is further configured to determine whether there exists an instability in the motor control system.

30. The built-in autotuning system according to claim 29, wherein said processing unit is further configured to generate a closed-loop Bode plot of the motor control system to determine.

31. The built-in autotuning system according to claim 29, wherein said processing unit is further configured to set a loop proportional gain of the motor control system based on the information from said processing unit regarding whether there exists an instability.

32. The built-in autotuning system according to claim 25, said processing unit is further configured to determine whether an integral gain of the motor control system is within a predetermined range.

33. The built-in autotuning system according to claim 32, said processing unit is further configured to set the integral gain based on the information from said processing unit regarding whether there exists an instability.

* * * * *